United States Patent [19]
LaFleur et al.

[11] Patent Number: 5,701,650
[45] Date of Patent: Dec. 30, 1997

[54] TOOLS FOR INSERTING AND REMOVING LINER OUTLET SPOUTS

[75] Inventors: Arthur E. LaFleur; Lee LaFleur, both of Manistee, Mich.

[73] Assignee: Custom Packaging Systems, Inc., Manistee, Mich.

[21] Appl. No.: 799,987

[22] Filed: Feb. 13, 1997

Related U.S. Application Data

[63] Continuation of Ser. No. 348,041, Dec. 1, 1994, abandoned, which is a continuation-in-part of Ser. No. 67,702, May 25, 1993, Pat. No. 5,385,268.

[51] Int. Cl.$^6$ .................................................. B23P 19/04
[52] U.S. Cl. .................... 29/267; 29/282; 29/235; 29/238; 29/239; 29/251; 29/252; 29/278
[58] Field of Search ..................... 29/251, 252, 267, 29/263, 278, 270, 280, 282, 238, 239; 254/30–31, 131, 18–23

[56] References Cited

U.S. PATENT DOCUMENTS

| | | | |
|---|---|---|---|
| 301,799 | 7/1884 | Campbell | 254/23 |
| 760,041 | 5/1904 | Tauber | 254/23 |
| 983,809 | 2/1911 | Covey | 254/31 |
| 2,441,756 | 5/1948 | De Swart | 29/267 |
| 2,889,618 | 6/1959 | Morris et al. | 29/267 |
| 2,947,073 | 8/1960 | Boyer | 29/267 |
| 2,983,533 | 5/1961 | Tisch . | |
| 3,252,210 | 5/1966 | Bowden | 29/267 |
| 3,900,221 | 8/1975 | Fouts . | |
| 3,977,687 | 8/1976 | Manganelli | 269/48.1 |
| 4,157,810 | 6/1979 | Haller et al. | 254/131 |
| 4,314,768 | 2/1982 | Goglio et al. . | |
| 4,316,557 | 2/1982 | Benoun et al. . | |
| 4,790,029 | 12/1988 | LeFleur et al. . | |
| 4,817,824 | 4/1989 | LaFleur et al. . | |
| 4,996,760 | 3/1991 | Coleman . | |
| 5,040,905 | 8/1991 | Boyd . | |
| 5,064,096 | 11/1991 | Illing et al. . | |
| 5,102,100 | 4/1992 | Troncoso | 29/267 |
| 5,158,218 | 10/1992 | Wery . | |
| 5,205,541 | 4/1993 | Roberts et al. | 29/267 |
| 5,219,040 | 6/1993 | Meuer et al. . | |
| 5,408,732 | 4/1995 | Anfuso | 29/263 |

OTHER PUBLICATIONS

One sheet Titled Liquitote Systems Steel Stock TAnk DOT 57.

Primary Examiner—Robert C. Watson
Attorney, Agent, or Firm—Barnes, Kisselle, Raisch, Choate, Whittemore & Hulbert

[57] ABSTRACT

Tools for inserting a spout of a flexible bag liner into fluid-tight sealing and anchoring engagement with a discharge outlet of a container and for removing the spout from the outlet. The spout has at least two seal rings, preferably each having a pair of axially spaced and radially outwardly extending lobes, for firmly frictionally engaging the container discharge outlet to provide a fluid-tight seal between the spout and outlet and to anchor the liner within the container. The tools have a collet carried by a shaft for releasably engaging the spout to apply force to the spout during operation of the tools. In one form the tools are actuated by a hydraulic or pneumatic drive and in another form the tools are manually actuated by pivotally moving a lever arm.

14 Claims, 5 Drawing Sheets

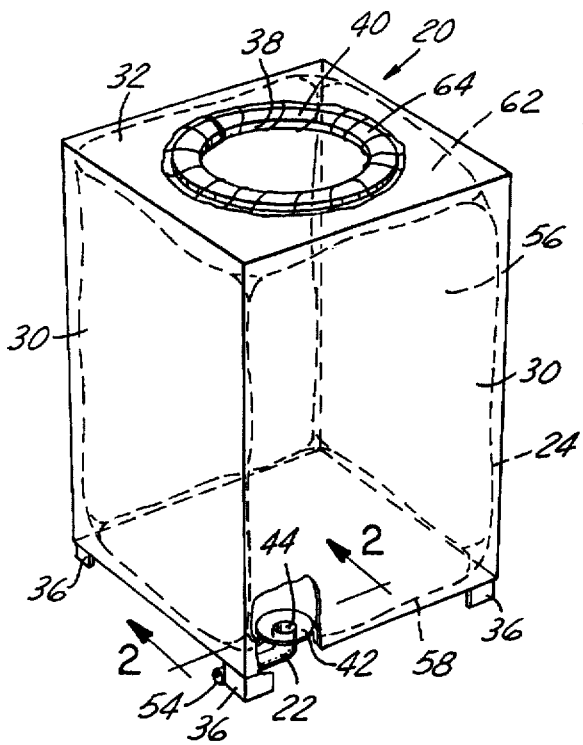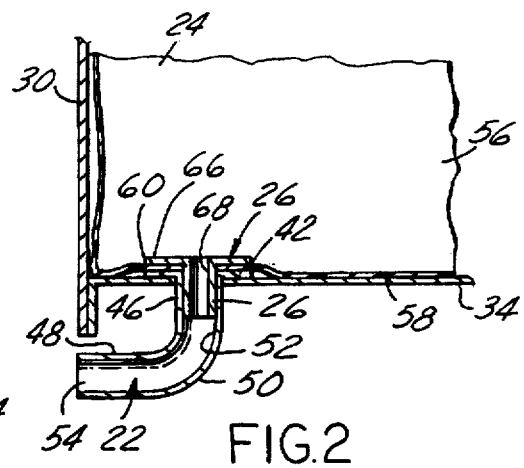
FIG. 1
FIG. 2
FIG. 3
FIG. 4

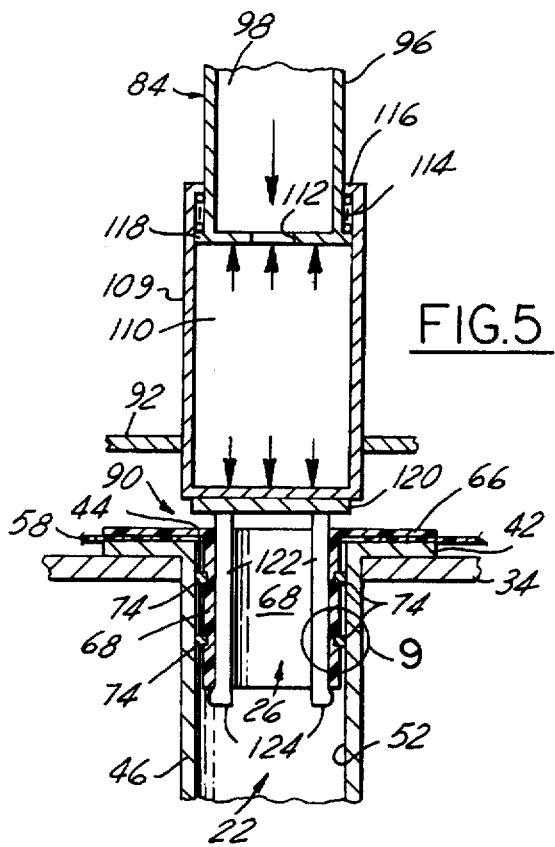
FIG. 5
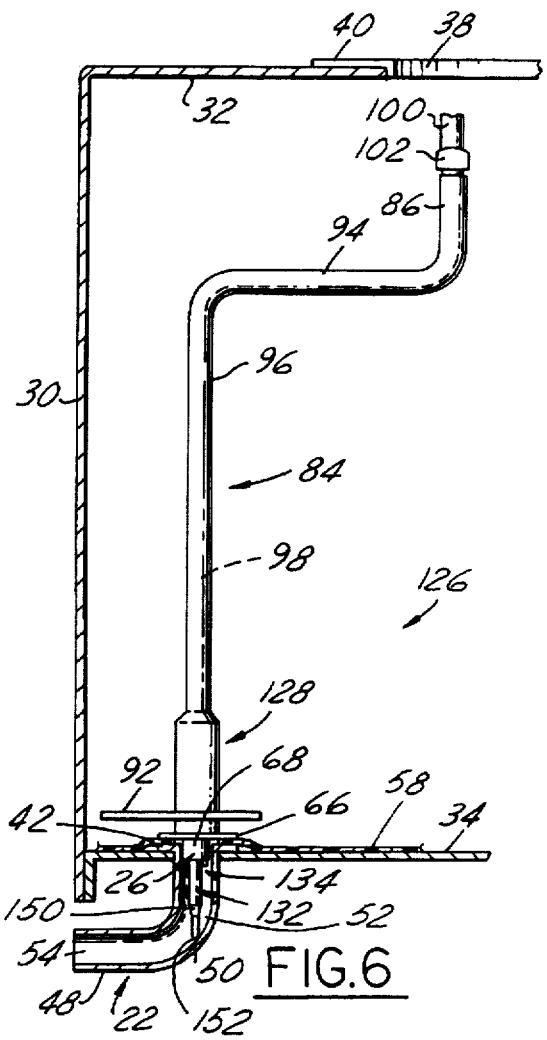
FIG. 6
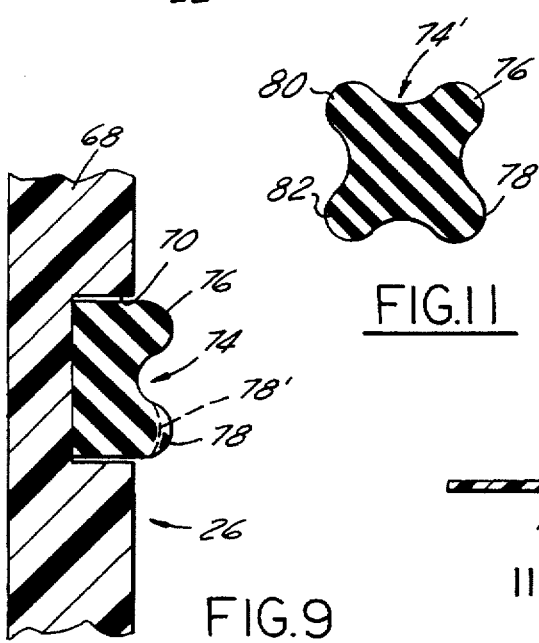
FIG. 9
FIG. 11
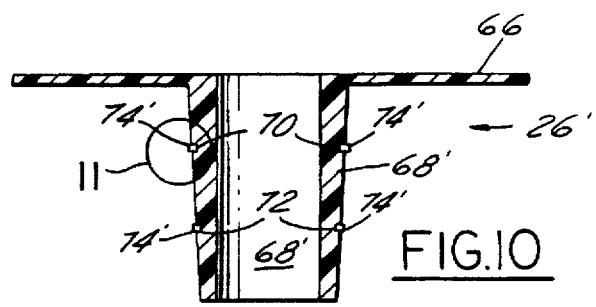
FIG. 10

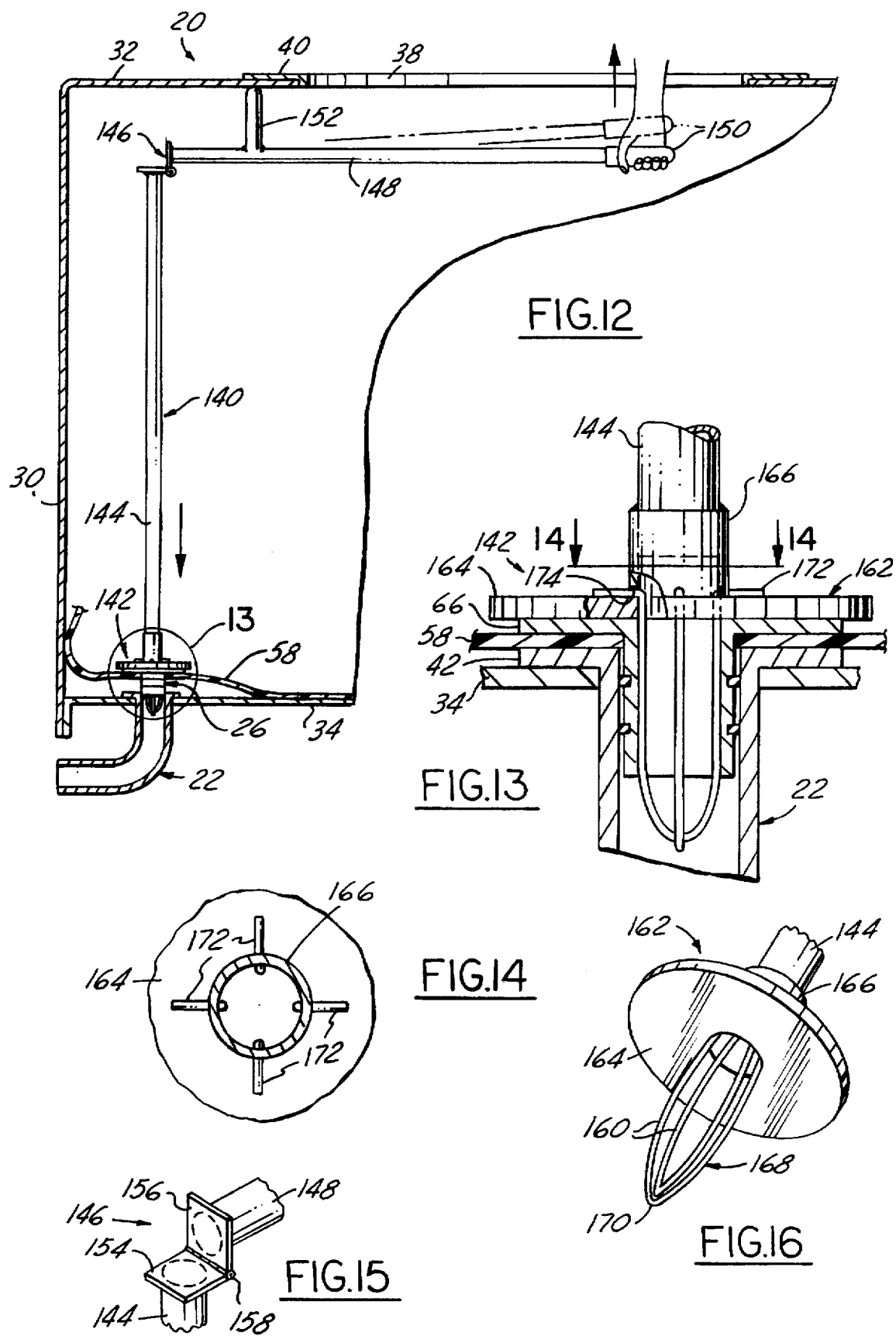

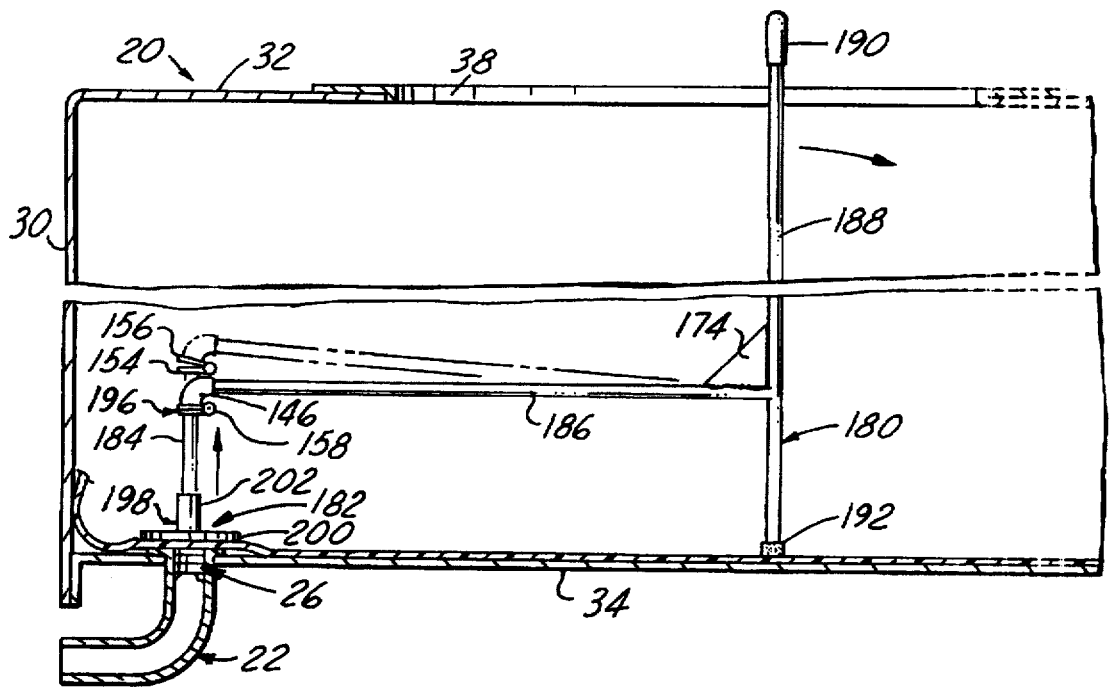
FIG.17
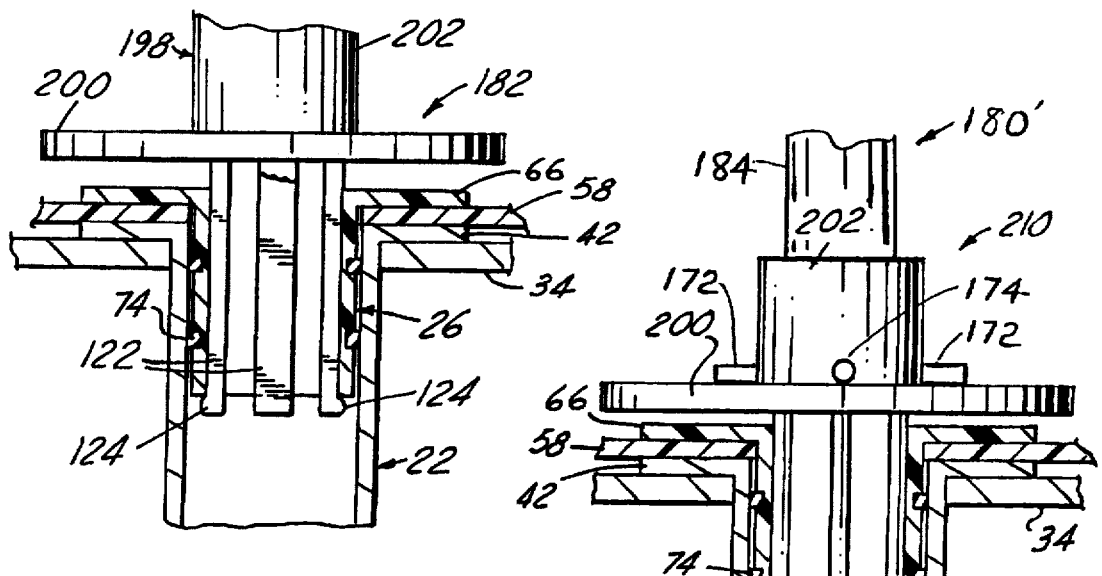
FIG.18
FIG.19

5,701,650

TOOLS FOR INSERTING AND REMOVING LINER OUTLET SPOUTS

REFERENCE TO APPLICATION

This is a continuation of U.S. patent application Ser. No. 08/348,041 filed on Dec. 1, 1994 now abandoned, which is a continuation-in-part of U.S. patent application Ser. No. 08/067,702 filed on May 25, 1993 and issued on Jan. 31, 1995 as U.S. Pat. No. 5,384,268.

FIELD OF THE INVENTION

This invention relates to flexible bag liners for use in a bulk container and more particularly to tools for inserting an outlet spout of the liner into a discharge outlet of the container and for removing the spout from the outlet.

BACKGROUND OF THE INVENTION

Flexible bags are frequently used to line tanks and other rigid containers to hold various types of liquids and flowable solids. Such bag liners are advantageous because they reduce or eliminate clean up of the tanks, enable highly caustic, acidic, or other chemically reactive or hazardous materials to be stored without damaging the tank, and are relatively cost effective. However, if a fluid tight seal between the outlet spout of the flexible bag liner and the tank discharge outlet is not achieved and maintained, liquid within the liner can flow around the spout and between the liner and tank sidewalls back into the tank increasing clean up and possibly damaging the tank. Likewise, if the spout is not adequately secured within the tank outlet, the bag can float to the top of the tank as liquid is drained, pulling the spout out of the outlet and causing the contents of the bag to leak into the tank.

Unfortunately, a spout providing a fluid-tight seal and anchoring the bag within the container requires a great deal of force to both insert the spout into the discharge outlet before filling the bag and to remove the spout after emptying the bag. Entry into the container to manually engage the spout is generally impractical since it may be unsafe or difficult to maneuver within the tank, cause damage to the liner resulting in contamination of the tank, or require more force than physically available to insert or remove the spout. Similarly, a person attempting to manually insert or remove the spout from outside the tank is not likely to possess a sufficient mechanical advantage to apply an adequate amount of force to complete the task. Moreover, unless the force is applied generally along the axis of the spout, the seal may not be fluid-tight or may fail to anchor the liner when seated, removal or insertion of the spout may be more difficult, or the spout may be damaged resulting in contamination of the tank.

SUMMARY OF THE INVENTION

Tools for inserting and removing the spout of a flexible liner from a discharge outlet of a rigid container. The spout typically has two or more flexible and resilient seal rings received thereon for firmly frictionally engaging the container discharge outlet to provide a fluid-tight seal between the spout and outlet and to anchor the liner within the container. Preferably, each seal ring has a pair of axially spaced and radially outwardly extending lobes for more firmly frictionally engaging the inner surface of the discharge outlet. When placed within the container, the tool is used to insert the spout into firm frictional engagement with the discharge outlet. To remove the spout, the tool is used to engage the spout to pull the spout from the outlet.

In one embodiment, the tool has a shaft with a handle at one end for manual engagement to manipulate the tool within the container during use. A hydraulic or pneumatic drive cylinder for applying force to the spout is attached to the shaft. Attached to the free end of the cylinder is a collet for releasably engaging the spout to transfer force from the drive to the spout during operation. Preferably, a brace is attached to the shaft for supporting the tool against an inner wall of the container to drive the spout into the container discharge outlet. To remove the spout, a rod is extended from the drive cylinder and through the collet for latching the collet to the spout. During removal, the free end of the rod bears against the discharge outlet to pull the collet and hence draw the spout free of the outlet.

In another embodiment, the tools have a manually operated drive for advancing or retracting the shaft to insert or remove the spout. For inserting the spout, the shaft of the tool is pivotally connected to a lever arm having a fulcrum between its ends which bears on a wall of the container when the lever arm is pivoted to move the shaft toward the discharge outlet to insert the spout into it. For removing the spout, another tool has a lever arm rigidly connected between its ends to one end of a carrier arm which is connected adjacent its other end, preferably pivotally, to the shaft. In use, an end of the lever arm bears on the container and is pivoted about this end to move the shaft generally axially away from the discharge outlet to withdraw the spout from it.

Objects, features and advantages of this invention are to provide tools which may be used with a minimum of manual effort to insert a spout into firm frictional engagement with a discharge outlet of a container to provide a fluid-tight seal therewith, may be used to quickly and easily remove the spout without damaging the liner and/or contaminating the container, and are strong, rugged, easy to maneuver, durable, of simple design, of economical manufacture and easy to use.

BRIEF DESCRIPTION OF THE DRAWINGS

FIG. 1 is a perspective view of a bulk container broken away to illustrate a discharge outlet of the container.

FIG. 2 is a fragmentary sectional view taken along the line 2—2 of FIG. 1 showing the discharge outlet in more detail.

FIG. 3 is a fragmentary sectional view of the container and outlet illustrating a tool of this invention for inserting a discharge spout of a flexible bag liner into the outlet.

FIG. 4 is a fragmentary sectional view of the container and outlet, and a drive cylinder assembly of the tool.

FIG. 5 is a fragmentary sectional view of the discharge outlet and drive of the tool also detailing the construction and arrangement of a pair of seal rings carried by the spout.

FIG. 6 is a fragmentary sectional view of the container and outlet illustrating a second tool embodiment for removing the spout from the container discharge outlet.

FIG. 9 is an enlarged fragmentary sectional view of the spout detailing the seal ring illustrated in FIG. 5.

FIG. 10 is a sectional elevation view of a tapered discharge spout illustrating a second seal ring embodiment received on the spout.

FIG. 11 is an enlarged sectional view of the second seal ring shown in FIG. 10.

FIG. 12 is a fragmentary sectional view of the container and outlet illustrating another embodiment of a tool of this invention which is manually actuated to insert a discharge spout of a flexible bag liner into the container outlet.

FIG. 13 is an enlarged fragmentary sectional view of the container outlet of FIG. 12 illustrating the tool and spout when fully inserted into the container outlet.

FIG. 14 is a fragmentary sectional view taken on lines 14—14 of FIG. 13.

FIG. 15 is a fragmentary sectional view of a pivotal connection of a shaft and lever arm of the tool of FIG. 12.

FIG. 16 is a fragmentary perspective view of the collet of the tool of FIG. 12.

FIG. 17 is a fragmentary sectional view of the container and outlet illustrating another embodiment of a tool of this invention which is manually actuated to remove the discharge spout from the container outlet.

FIG. 18 is an enlarged fragmentary sectional view of the container outlet, spout and collet of the tool of FIG. 17.

FIG. 19 is an enlarged fragmentary sectional view illustrating another manually actuated tool.

DETAILED DESCRIPTION OF THE INVENTION

Figure 7:
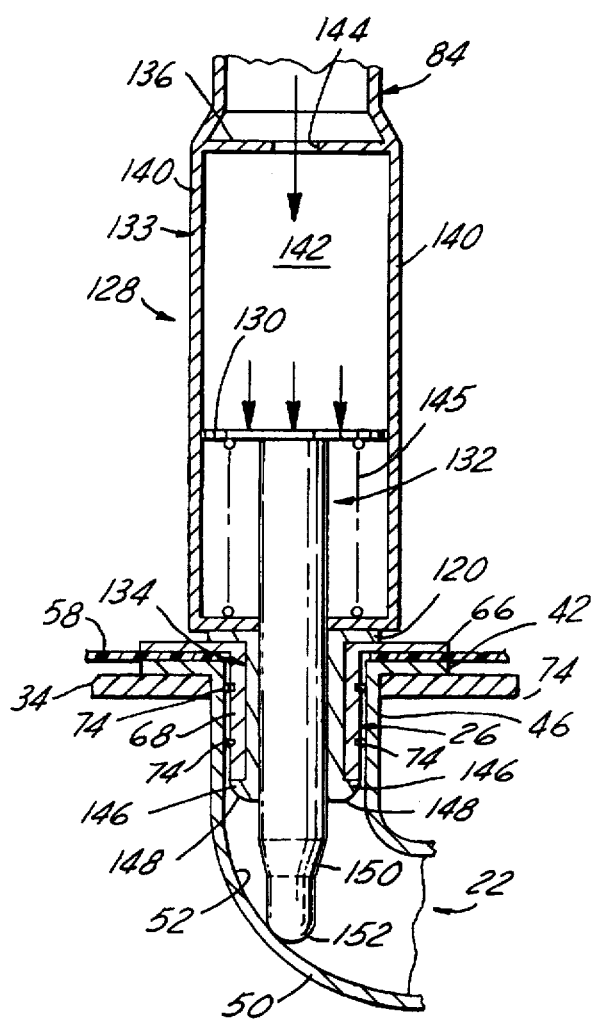
FIG. 7 is a fragmentary sectional view of the outlet and a drive of the second tool shown engaging a seated spout.

Referring in more detail to the drawings, FIGS. 1–3 illustrate a container 20 having a tubular discharge outlet 22 for receiving a flexible bag liner 24 having an attached discharge spout 26 and a tool 28 for inserting the spout 26 into the outlet 22. The container 20 has rigid sidewalls 30, a rigid top wall 32, a rigid bottom wall 34 to receive and support the bag 24 and feet 36 depending from the bottom 34 to support the container 20. Preferably, the sidewalls 30 and bottom 34 are each of one-piece construction, and independently capable of containing the contents of the bag 24. Preferably, the top 32 has a filler opening 38 which may be encompassed by a collar 40 surrounding the opening 38. If desired, the container 20 may be a housing, tank, cage, collapsible container, or any other receptacle capable of receiving and supporting the bag 24.

The discharge outlet 22 preferably depends downwardly from the bottom wall 34 of the container 20 and has a flange 42 around the mouth or inlet opening 44 of the outlet 22 which is welded or otherwise attached to the bottom 34. From inlet opening 44, a downwardly extending leg 46 of the outlet 22 is joined to a generally horizontal leg 48 by elbow 50. To telescopically receive the generally cylindrical spout 26 of the bag 24 within the discharge outlet 22, the inlet opening 44 and inner peripheral surface 52 of the vertical leg 46 are preferably generally circular in cross section. The discharge outlet 22 preferably has a control valve or another flow control device (not shown) disposed at its discharge end 54 for controllably emptying the contents of the bag 24 from the container 20.

Preferably, the bag 24 is conformable to the interior of the container 20 and is constructed of a flexible material impervious to its intended contents such as low or high density polyethylene, polypropylene or other plastic material. The bag liner 24 has a sidewall 56, a bottom wall 58 and a discharge outlet opening 60 located in the bottom 58. The outlet opening 60 is preferably generally coaxially aligned with the mouth 44 of the discharge outlet 22 when the spout 26 is seated in the discharge outlet 22 of the container 20. Preferably, the bag 24 has a top wall 62 with a flexible filling spout 64 located in the top wall.

The discharge spout 26 is of one-piece tubular construction having an outwardly extending flange 66 attached to one end of a generally cylindrical and self-supporting tube 68 and is preferably constructed of a low or high density polyethylene, polypropylene, or some other similarly durable, and generally chemically inert material. Flange 66 is preferably sealed and permanently fixed to the liner 24 around the entire periphery of the bag discharge outlet 60 by a circumferentially continuous heat or adhesive seal (not shown). While the spout 26 preferably has a tube 68 of generally circular and uniform cross section extending from the flange 66, a spout 26' with a tube 68' having a radially tapered outer surface, as shown in FIG. 9, may be used. The tubes, 68 and 68', each preferably have at least two circumferentially continuous grooves 70, 72 in the outer surface, each for receiving a seal ring 74 or 74' therein.

As shown more particularly in FIGS. 4–5, a circumferentially continuous seal ring 74 is received within each groove 70, 72 of the discharge spout tube 68. Preferably, each ring 74 is an O-ring of a resilient, chemically inert plastic, neoprene rubber or some other elastomeric material. When the tube 68 is received within the discharge outlet 22, such as is shown in FIG. 5, each seal ring 74 firmly frictionally engages the inner peripheral surface 52 of the outlet 22 to provide a fluid-tight seal between the spout 26 and the outlet 22 and to anchor the liner 24 within the container 20. Additional seal rings may be provided if more anchoring force or a redundant seal is desired.

As is illustrated more clearly in FIG. 9, each seal ring 74 preferably has radially outwardly extending upper and lower lobes 76 & 78 which provide an interference fit between the spout 26 and the discharge outlet 22 for firm frictional engagement therebetween. If additional frictional and sealing engagement between each ring and the tube 68 is desired, rings 74' (FIG. 11) can be used which also have a pair of axially spaced and radially inwardly extending lobes 80, 82. To facilitate insertion, each ring 74 and 74' may be radially tapered having a lower lobe 78' of reduced radius as shown in phantom in FIG. 9. Preferably, the lobes 76, 78 of each sealing ring 74 are lubricated with water, oil or a teflon grease to ease insertion into the discharge outlet 22.

FIGS. 3–5 illustrate a tool 28 of this invention for inserting a spout 26 of a flexible bag liner 24 into a discharge outlet 22 of a container 20. The tool 28 has a shaft 84 with a handle 86 at one end for manual engagement to position the spout tube 68 generally coaxially over the inlet opening 44 of the outlet 22. Attached to the opposite end of shaft 84 is a preferably pneumatic or hydraulic drive cylinder 88 for providing force adequate to telescopically insert the spout 26 into firm frictional engagement with the discharge outlet 22. To maneuver the spout 26 within the container 20 during the use and operation of the tool 28, a collet 90 is attached to the end of the drive cylinder 88 for releasably retaining the spout thereon. Preferably, a collar 92, of a durable material such as PLEXIGLAS, extends outwardly from the drive cylinder 88 to prevent the liner 24 from becoming disposed over the inlet opening 44 of the discharge outlet 22 and/or tangled with the tool 28 and being damaged during insertion of the spout 26.

To dispose the handle 86 adjacent the container inlet 38, the tool 28 preferably has a generally horizontal leg 94 extending between the handle 86 and the shaft 84 for use with containers having a discharge outlet spaced laterally from the filler opening. To reach the outlet 22, the shaft 84 has a generally vertical section 96 of sufficient length. An internal passageway 98 within the shaft 84 is connected at one end to a supply hose 100 by a coupling 102 attached to the free end of the handle 86 and is in communication at the opposite end with the drive cylinder 88 to supply a suitable fluid to power the cylinder 88 during operation. The shaft 84 preferably has a brace 104 with a generally flat support plate 106 attached to the free end for bearing against the inner surface of the container top wall 32 to support the tool 28 during insertion of the spout 26. If desired, the support plate 106 may be padded to prevent damaging the liner 24 during operation. Preferably, the handle 86 or shaft 84 has a level indicator 108 in a visible position for assisting an operator of the tool 28 to more accurately coaxially align the shaft section 96 and brace 104 with the inlet opening 44 of the discharge outlet 22 to properly insert the spout 26 therein. A fluid-tight fitting (not shown) may be provided on the shaft 84 to remove or change the drive cylinder 88 and collet 90.

As shown in FIGS. 4 & 5, the drive cylinder 88 is a movable, generally cylindrical sleeve and piston telescoped over and slidably received on the shaft section 96. Within the cylinder 88 is a chamber 110 for receiving air or hydraulic fluid from an opening 112 in the end of the shaft 84 to extend the cylinder 88 during operation to insert the spout 26. In response to increasing pressure within the chamber 110, the cylinder 88 will move from a generally retracted position (FIG. 4) to an extended position (FIG. 5) for exerting sufficient force against the spout 26 to seat it into firm frictional engagement with the container discharge outlet 22. Preferably, the cylinder 88 has a spring 114 disposed between an inturned lip 116 of cylinder 88 and a flange 118 of the shaft 84 biased to return the cylinder 88 to the retracted position when the pressure within the chamber 110 is relieved to facilitate withdrawing the collet 90 from the spout 26 after the tube 68 has been inserted. To prevent the cylinder 88 from disengaging from the shaft 84 when fully extended, the cylinder 88 stops against the spring 114 when fully compressed (FIG. 5).

The collet 90 is attached to the free end of the drive cylinder 88 for movement in unison therewith during operation. The collet 90 has a base 120 attached to the end of the cylinder 88 which is preferably larger than the mouth of the spout 26 to bear on its flange 66 to assist in driving the tube 68 and seal rings 74 into the discharge outlet 22. At least two flexible fingers 122 depend from the collet base 120 and project into the tube 68 to releasably retain the spout 26 on the collet 90. Preferably, each finger 122 is yieldingly biased outwardly to frictionally engage against the inner diametral surface of the spout tube 68 when inserted therethrough. The end of each finger 122 preferably has an outwardly projecting retainer detent 124 for providing an interference fit with the tube 68 to retard removal of the spout 26 from the collet 90 as shown in FIG. 5. Preferably, the leading and trailing edge of each detent 124 are generally rounded to cammingly facilitate insertion and removal of the spout 26.

Figure 8:
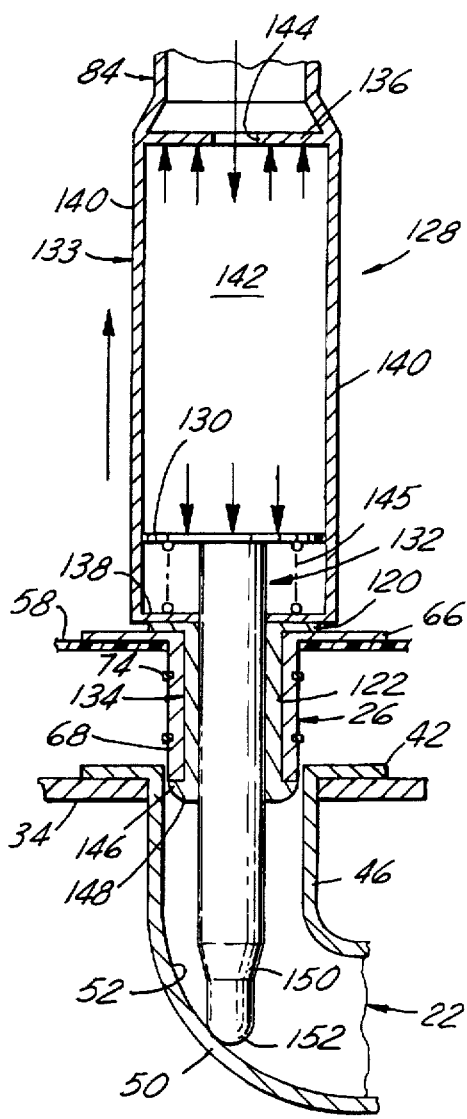
FIG. 8 is a fragmentary sectional view of the outlet and drive of the second tool shown removing the spout from the discharge outlet.

FIGS. 6–8 illustrate a tool 126 for removing the spout of a flexible bag liner from a discharge outlet of a container. The tool 126 has a shaft 84 with a handle 86 at one end for manipulating the tool into engagement with the spout 26. Shaft 84 is constructed and arranged to fit the container received in, as previously discussed, and hence will not be further described. Immovably affixed to the opposite end of the shaft 84 is a drive cylinder 128. For providing force to unseat the spout 26, the cylinder 128 is attached to the shaft 84 and has a piston 130 and rod 132 slidably received therein. A collet 134 for releasably gripping the spout 26 during removal is attached to the end of the cylinder 128. The rod 132 passes through the collet 134 and when extended bears on the elbow 50 of the discharge outlet 22 for lifting an engaged collet 134 to pull the spout 26 out of the outlet 22.

As shown in FIGS. 7 and 8, the cylinder 128 has a top end wall 136 attached to the shaft 84, a bottom end wall 138 and a preferably cylindrical sidewall 140 defining a drive cylinder chamber 142. At one end of the chamber 142 is an inlet opening 144 in the top wall 136 communicating with the passageway 98 within the shaft 84. Piston 130 is received within the chamber 142 for translating fluid pressure changes within the chamber 142 into rod displacement during removal. Preferably, a spring 145 is disposed between the piston 130 and bottom wall 138 of the cylinder 128 to retract the rod 132 when the pressure within the chamber 142 is relieved for withdrawing the tool 126 and spout 26 from the container 20.

Collet 134 is essentially the same as collet 90 except that the free end of each finger 122 has a pawl 146 projecting outwardly for underlying and positively gripping the outer axial end of the spout tube 68 to transmit a pulling force to the spout 26 during removal. Preferably, each pawl 146 has a contoured leading edge 148 to ease insertion of each finger 122 into the spout tube 68. In all other respects, the collet 134 has essentially the same construction as collet 90.

To facilitate insertion and removal of the collet 134 into and from the spout 26, each collet finger 122 flexes to move the pawl 146 radially inward when the rod 132 is fully retracted into the drive cylinder 128. Preferably, the rod 132 has a tapered portion 150 adjacent the free end for providing clearance between each finger 122 and the rod 132 when retracted to allow each finger 122 to flex freely. When the pawls 146 underlie the free end of the spout tube 68 and the rod 132 is extended through the collet 134, the rod 132 prevents the pawls 146 from moving radially inward and disengaging from the spout tube 68. When the rod 132 is extended beyond the collet 134, the rod 132 and flange 120 of the collet 134 help to seal the mouth and throat of the spout tube 68 for preventing the remaining contents of the bag 24 from leaking out the spout 26 during removal and contaminating the container 20. As the rod 132 is further extended (FIG. 8), the free end of the rod 132 bears against the discharge outlet elbow 50 and forces the collet 134 upwardly to unseat and extract the spout 26 from the outlet 22. To avoid damaging the elbow 50 during removal, the free end of the rod 132 preferably has a rounded tip 152. Alternatively, a tip of a protective material, such as rubber, may be affixed to the free end of the rod 132 (not shown).

In using tool 28 to insert the spout 26, the collet 90, drive cylinder 88 and shaft 84 are inserted through the filler spout 64 of the liner bag 24 and manipulated within the bag 24 until the collet 90 is received by the spout 26. As the collet 90 is inserted into the tube 68, the retainer detents 124 are cammingly received within the tube 68, flexing the collet fingers 122 inwardly. When the detents 124 exit the opposite end of the tube 68 they snap outwardly to releasably retain the tube 68 on the collet 90. With the spout 26 on the collet 90, the tool 28 is used to manipulate the liner 24 and spout 26 within the container 20 until the tube 68 is positioned over the inlet opening 44 of the container discharge outlet 22, and in general coaxial alignment therewith. If provided, the level 108 is preferably used to assist the tool operator in positioning the shaft 84 vertically to more accurately coaxially align the spout 26 with the inlet opening 44 before inserting the spout 26 into the outlet 22.

In operation, air or hydraulic fluid is controllably introduced into the drive cylinder chamber 110 extending the drive cylinder 88 from the shaft 84 and lifting the tool 28 until the support plate 106 of the brace 104 bears against the inner surface of the container top wall 32. With the tool 28 supported within the container 20, the cylinder 88 is extended further, pushing the collet 90 downwardly and driving the spout tube 68 into the discharge outlet 22 as illustrated in FIG. 4. The drive cylinder 88 and outlet 90 are extended until the seal rings 74 on the tube 68 firmly frictionally engage the inner wall 52 of the discharge outlet 22 providing a fluid-tight seal between the spout 26 and outlet 22 and anchoring the bag 24 within the container 20. Preferably, the spout 26 is inserted into the outlet 22 until the flange 66 of the spout 22 abuts against the bottom of the container 20, as shown in FIG. 5. To remove the tool 28, the fluid pressure is relieved, the drive cylinder 88 is retracted, the collet fingers 122 are pulled and removed from the spout 26, and the tool 28 is lifted out of the container 20.

To remove the spout 26 from the discharge outlet 22 for removing the bag liner 24 from the container 20 when it is empty, the tool 126 of FIG. 6 is inserted into the container 20 and manipulated to insert the collet 134 into the spout tube 68. With the rod 132 retracted, a generally downwardly pressure is manually applied to the tool handle 86 to cause the leading edge 148 of each pawl 146 to cammingly engage the inner surface of the tube 68 to flex each collet finger 122 inwardly for being telescopically received by the spout 26. Each pawl 146 snaps outwardly when completely received through the tube 68 to grip the spout 26 to pull the tube 68 out of the discharge outlet 22 during operation.

In operation, the drive 128 is powered to extend the drive rod 132 through the collet 134 for retaining the pawls 146 of the fingers 122 in engagement with the spout tube 68 to latch the collet 134 to the spout 26. As the rod 132 is further extended until the tip 152 of the rod 132 bears against the elbow 50 of the discharge outlet 22 causing a generally upwardly directed removal force to be applied to the spout 26 by the collet 134 (FIG. 7). As pressure increases within the drive cylinder 128, the rod 132 displaces the collet 134 upwardly pulling the spout tube 68 and seal rings 74 out of the discharge outlet 22 (FIG. 8).

Upon extracting the spout 26 from the outlet 22, the tool 126, bag 24 and spout 26 are removed from the container 20. If necessary, the drive rod 132 may be retracted into the drive cylinder 128 to provide sufficient clearance for removing the tool 132 from the container 20. With the rod 132 retracted, the collet fingers 122 may be manually flexed inwardly to disengage the pawls 146 from the spout tube 68 to remove the spout 26 from the collet 134.

Additional anchoring force can also be provided by using seal rings 74 of different and increasing outside diameter from the free end to the flange end of the spout tube 68 thereby effectively achieving a tapered arrangement of the seal rings on the spout tube.

FIGS. 12–16 illustrate another tool 140 of this invention which is manually actuated to insert a spout 26 of a flexible bag liner into the outlet 22 of the container 26. The tool 140 has a spout receiving collet 142 attached to one end of a carrier shaft 144 which is pivotally connected by a hinge 146 to one end of a lever arm 148 with a hand grip 150 on its other end. To force the spout 26 into the outlet 22, the lever arm pivots about a fulcrum arm or pin 152 which is fixed to it between its ends and bears on the upper wall 32 of the container. As shown in FIG. 15, the hinge has a pair of plates 154 & 156 fixed by welds to the adjacent ends of the lever arm and carrier shaft and having interleaved eyelets connected together by a hinge or pivot pin 158 which extends transversely to the axes of both the shaft and the arm.

The collet 142 has four equally circumferentially spaced apart spring fingers 160 carried by a body 162 with an annular flange 164 fixed to one end of a tube 166 which is telescoped over and fixed to the shaft 144. Preferably, a pair of fingers 160 are formed from a loop 168 of spring steel wire with a return bend or bight 170 connecting the distal ends of the fingers and having the tangs 172 at the free ends formed by right angle bends and received in holes 174 through the tube 166 of the body. To facilitate insertion of the fingers into the spout, they have a generally arcuate configuration and converge toward the bight 170 at their distal ends.

As shown in FIGS. 12 and 13, when using the tool 140 to install the spout 26, it is disposed over and frictionally retained by the spring fingers 160 bearing on the interior of the neck 68 of the spout with its flange 66 bearing on the flange 164 of the tool collet. The tool 140 with the spout 26 carried by the collet 162 is inserted into the container 20 with its fingers piloted in the discharge outlet 22 with the shaft 140 extending generally vertically and its fulcrum 152 underlying the top wall 32 of the container. As the lever arm 48 is manually pivoted counterclockwise (as viewed in FIG. 12), by grasping the handgrip 150, the carrier shaft 144 is forced downwardly in unison with the collet 162 to move the neck 68 of the spout 26 into the discharge outlet 22 (as shown in FIG. 13), so that the adjacent portion of the bag 58 and the flange 66 of the spout bear on the flange 42 of the outlet 22. After the spout 26 is fully inserted into the outlet, the tool 140 is manipulated, such as by manually grasping the carrier shaft 144, to move it and the collet 162 vertically upward to disengage the collet fingers 170 from the spout. Thereafter, the tool 140 is removed from the container 20.

FIGS. 17 and 18 illustrate a manually actuated tool 180 for removing a spout 26 from the discharge outlet 22 of the container 20. The tool has a spout engaging collet 182 fixed to one end of a carrier shaft 184 which is preferably pivotally connected by a hinge 146 to one end of a carrier arm 186 fixed at its other end to a lever arm 188. The lever arm 188 has a hand grip 190 at one end and preferably a bumper foot 192 at the other end providing a fulcrum about which it pivots to move the collet and shaft generally vertically upward. The carrier arm 186 is fixed to the lever arm 188 and reinforced by a gusset 194 attached to them, such as by welds. One plate 156 of the hinge 146 is fixed to an elbow 196 secured to the other end of the carrier arm and the other plate 154 is fixed to the upper end of the shaft 184. The axis of the hinge pin 158 extends transversely to the longitudinal axes of both the carrier and the lever arms.

To releasably engage the spout 26, the collet 182 preferably has four equally circumferentially spaced spring fingers 122 slidably receivable within the neck of the spout, and each having at a distal end a radially outwardly projecting retainer detent 124 for underlying the bottom edge of the spout to releasably retain it on the collet during removal of the spout. Preferably, the leading and trailing edges of each detent 124 are somewhat rounded to provide cam surfaces facilitating insertion of the fingers into and removal of them from the spout. At the other end, the fingers are attached to and preferably integral with the collet body 198 which has an annular flange 200 attached to one end of a tube 202 which is fixed to the shaft 184.

In using the tool 180 to remove the spout 26 from the container outlet 22, the tool is disposed in the container 20 and manually manipulated so that the fingers 122 of the collet 182 pass through the neck 68 of the spout with the detents 124 underlying the lower edge of the neck, as shown in FIG. 18. To withdraw the spout, the hand grip 190 is grasped to manually pivot the lever arm 188 about its foot clockwise (as viewed in FIG. 17), and thereby move the shaft 184 and collet with the spout thereon generally vertically upward (as indicated by the arrow 204) to remove the spout from the outlet.

During this movement, the carrier arm 186 pivots about the hinge pin 158 relative to the shaft 184 so that the shaft and collet move substantially vertically upward. After the spout is removed from the outlet, the tool 180 with the spout thereon and the liner bag 24 are removed from the container through the filler opening 38. The spout is then removed from the collet 182 preferably by manually pressing the free ends of the finger 122 radially inward to disengage the detents 124 from the lower edge of the spout and then manually pulling the spout axially off of the collet.

FIG. 19 illustrates another manually actuated tool 180' removing a spout 26 from the discharge outlet 22 of the container. Except for its spout engaging collet 210, the tool 180' has the same construction and arrangement as the removal tool 180. The collet 210 has a flange 200 fixed to a hub 202 attached to the lower end of the shaft 184 of the tool. Four equally circumferentially spaced apart spring fingers 160 are formed from two loops 168 of spring steel with tangs 172 at the free ends received in holes 174 through the hub 202.

To releasably retain the spout 26 on the collet, each spring finger has a retainer detent 212 for underlying the bottom edge of the spout to retain it during removal of the spout. Preferably each detent 212 is integral with the wire fingers and may be formed thereon as an outwardly projecting barb. Preferably, to facilitate inserting the fingers 160 into the spout, each detent has an outer face which tapers axially upwardly and radially outwardly from the adjacent portion of its associated finger 160.

To remove a spout 26, the tool 180' is used in the same manner as the tool 180 and hence the manner of using it will not be repeated.

What is claimed is:

1. For a bulk container having sidewalls, end walls and a discharge outlet tube, and wherein a flexible bag liner having a self supporting spout with a tubular neck telescopically receivable in the outlet tube may be received, a tool for inserting the spout into the discharge outlet comprising:
    (a) a carrier shaft,
    (b) a collet at one end of the carrier shaft for engaging and releasably retaining the spout thereon, said collet extending generally axially of the carrier shaft, said collet having at least two resilient fingers telescopically insertable into the tubular neck of the spout to releasably retain the spout on the collet,
    (c) a lever arm pivotally connected adjacent one end to the carrier shaft adjacent the other end of the carrier shaft,
    (d) a fulcrum arm spaced from the pivotal connection, fixed to the lever arm, extending generally transversely to the longitudinal axis of the lever arm and having a free end constructed to bear on a wall of the container,
    (e) the lever and fulcrum arms being constructed so that when the tool is disposed in operative position in the bulk container the lever arm extends generally transversely of the carrier shaft when the free end of the fulcrum arm bears on a wall of the container, and
    (f) the carrier shaft, lever arm and fulcrum arm are constructed to move said collet generally axially relative to the container discharge outlet for inserting the spout into the discharge outlet into firm frictional engagement therewith to positively anchor and seal the liner within the container when force is applied to generally pivotally move the lever arm relative to the carrier shaft and about the free end of the fulcrum arm.

2. The tool of claim 1 wherein said collet comprises at least two flexible fingers for being telescopically inserted through the spout to releasably retain the spout thereon.

3. The tool of claim 2 wherein each of said fingers of said collet has an outwardly projecting generally arcuate retainer detent for providing an interference fit with the spout when received on said collet to releasably retain the spout on said collet.

4. The tool of claim 2 wherein each of said fingers of said collet has a pawl at the free end thereof for releasably retaining the spout on said collet and for engaging the spout to apply force thereto to remove the spout from the discharge outlet of the container.

5. The tool of claim 1 also comprising an outwardly extending collar adjacent said collet for engaging the bag liner to prevent the liner from becoming disposed over the inlet opening of the container discharge outlet or becoming tangled with the tool to prevent the liner from being damaged when inserting the spout into the discharge outlet.

6. The tool of claim 1 wherein said fulcrum arm is carried by said lever arm between its ends and constructed to bear on a wall of the container spaced from and generally opposed to the discharge tube of the container so that the lever arm can be manually moved to pivot about the free end of the fulcrum arm to move the collet generally axially to insert the neck of the spout into the discharge outlet into firm frictional engagement therewith.

7. The tool of claim 6 wherein said collet comprises a plurality of spring fingers constructed to be insertable into the neck of the spout in frictional engagement therewith to releasably retain the spout on the collet.

8. The tool of claim 6 wherein said lever arm is pivotally connected to said carrier shaft by a hinge with a pin having its pivotal axis extending generally transversely to the longitudinal axes of both said carrier shaft and said lever arm.

9. For a bulk container having sidewalls, end walls and a discharge outlet tube, and wherein a flexible bag liner having a self supporting spout with a tubular neck telescopically receivable in the outlet tube may be received, a tool for at least one of inserting the spout into the discharge outlet and removing the spout from the discharge outlet comprising:
    (a) a carrier shaft,
    (b) a collect at one end of the carrier shaft for engaging and releasably retaining the spout thereon, said collet extending generally axially of the carrier shaft, said collet having at least two resilient fingers telescopically insertable into the tubular neck of the spout to releasably retain the spout on the collect,
    (c) a lever arm pivotally connected adjacent one end to the carrier shaft adjacent the other end of the carrier shaft,
    (d) a fulcrum arm spaced from the pivotal connection, fixed to the lever arm, extending generally transversely to the longitudinal axis of the lever arm and having a free end constructed to bear on a wall of the container,
    (e) the lever and fulcrum arms being constructed so that when the tool is disposed in operative position in the bulk container the lever arm extends generally transversely of the carrier shaft when the free end of the fulcrum arm bears on a wall of the container, and
    (f) the carrier shaft, lever arm and fulcrum arm are constructed to move said collet generally axially relative to the container discharge outlet for at least one of inserting the spout into the discharge outlet into firm frictional engagement therewith to positively anchor and seal the liner within the container and removing the spout from the outlet for removing the liner from the container when force is applied to generally pivotally move the lever arm relative to the carrier shaft and about the free end of the fulcrum arm.

10. The tool of claim 9 which also comprises another arm rigidly connected between its ends to said lever arm adjacent the other end of said lever arm, and said another arm being constructed so that adjacent one end it forms said fulcrum arm which can bear on a wall of the container when said collet is inserted in the spout while received in the container discharge outlet and said lever arm can be manually pivoted about said one end to move said collet generally axially away from the container and discharge outlet to remove the neck of the spout from the container discharge outlet.

11. The tool of claim 10 wherein said another arm is connected to said carrier shaft by a hinge having a pivot axis extending transversely to the longitudinal axes of both said carrier another arm and said lever arm.

12. The tool of claim 10 wherein said another arm is connected to said carrier shaft by a hinge having a pair of plates connected by a pivot pin with its axis extending generally transversely to the longitudinal axes of both said another arm and said lever arm, and when said collect is inserted into the neck of the spout while fully received in the discharge outlet, said hinge plates are overlapping and substantially parallel to each other.

13. The tool of claim 10 wherein said collet comprises a plurality of fingers receivable in the neck of the spout, and at least two of said fingers are generally diametrically opposed and have detents thereon which underlie and overlap the lower edge of the neck of the spout to retain the spout on the collet while the tool is manually actuated to remove the spout from the container discharge outlet.

14. The tool of claim 6 wherein said collet comprises at least two flexible fingers extending from said carrier shaft for being telescopically inserted through the spout to releasably retain the spout thereon, at least two of said fingers each have an outwardly projecting generally arcuate retainer detent for providing an interference fit with the spout when received on said collect to releasably retain the spout on said collect.

* * * * *